April 13, 1926.

E. A. LAUGHLIN

CAR MOUNTING

Filed Sept. 12, 1921 2 Sheets-Sheet 1

Witnesses:

Inventor
Elmyr A. Laughlin
By Joshua R. H. Potts
His Attorney

April 13, 1926. 1,580,908
E. A. LAUGHLIN
CAR MOUNTING
Filed Sept. 12, 1921 2 Sheets-Sheet 2

Witnesses:
Wm. Schnellhardt
B. J. Richards

Inventor
Elmyr A. Laughlin
By Joshua R. H. Potts
His Attorney

Patented Apr. 13, 1926.

1,580,908

UNITED STATES PATENT OFFICE.

ELMYR A. LAUGHLIN, OF OREGON, ILLINOIS, ASSIGNOR, BY MESNE ASSIGNMENTS, OF ONE-HALF TO JOSHUA R. H. POTTS, OF CHICAGO, ILLINOIS.

CAR MOUNTING.

Application filed September 12, 1921. Serial No. 500,063.

*To all whom it may concern:*

Be it known that I, ELMYR A. LAUGHLIN, a citizen of the United States, and a resident of the city of Oregon, county of Ogle, and State of Illinois, have invented certain new and useful Improvements in Car Mountings, of which the following is a specification.

My invention relates to improvements in car mountings, and has for its object the provision of a simple and effective construction of this character arranged and adapted to alleviate friction in the operation of the car.

Another object of the invention is the provision of a simple and effective car mounting arranged and adapted to prevent or alleviate side swaying or movement of the car in travel.

Other objects will appear hereinafter.

The invention consists in the combinations and arrangements of parts hereinafter described and claimed.

Figure 1:
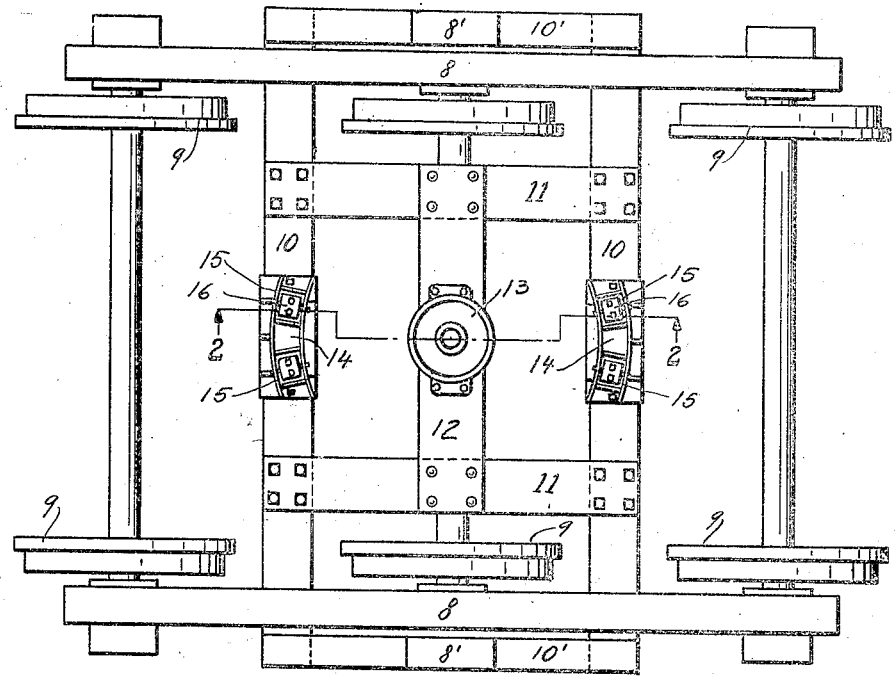
Figure 2:
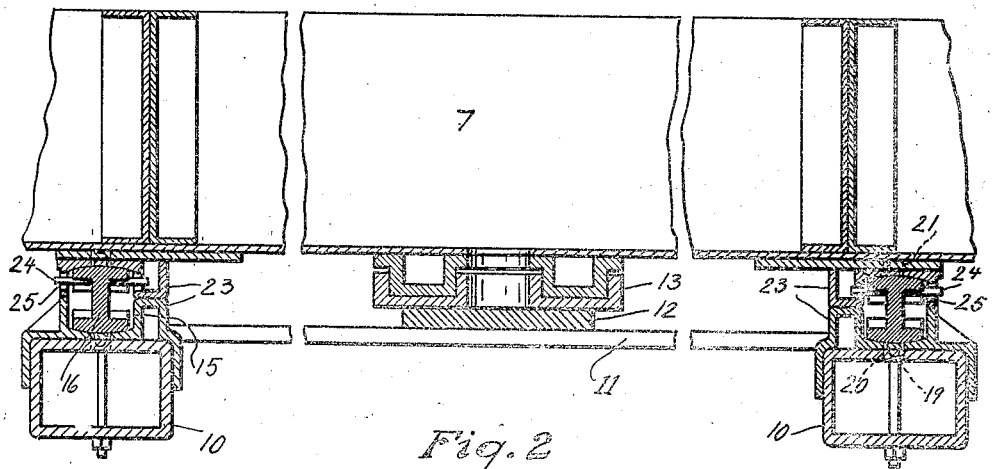
Figure 3:
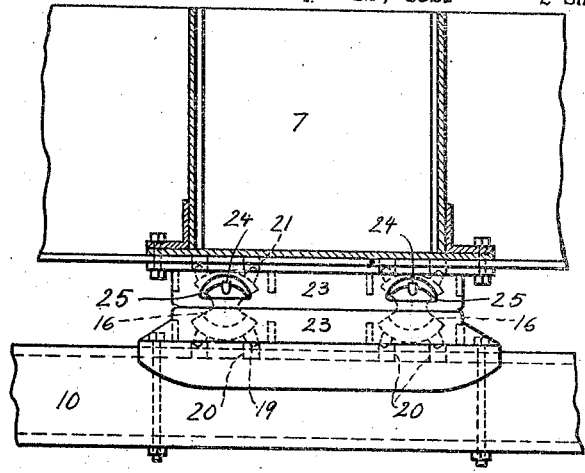
Figure 4:
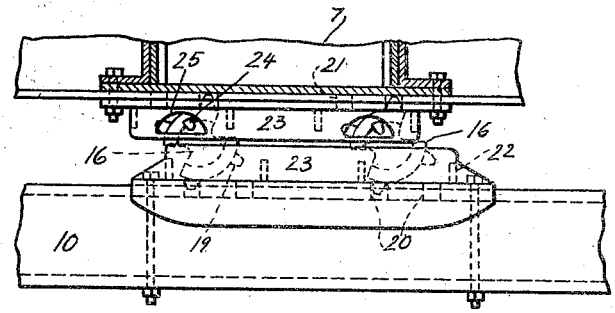
Figure 6:
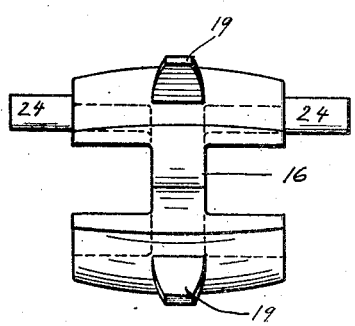
Figure 5:
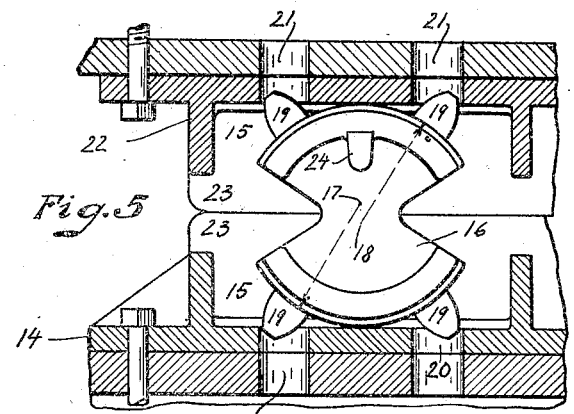

The invention will be best understood by reference to the accompanying drawings forming a part of this specification, and in which, Fig. 1 is a top plan view of a truck equipped with bearing means embodying the invention, Fig. 2, an enlarged longitudinal section taken substantially on line 2—2 of Fig. 1, Fig. 3, an enlarged front view shown partially in section, of one of the bearings employed in the construction, Fig. 4, a view similar to Fig. 3 but showing the positions assumed by the parts when the truck turns, Fig. 5, an enlarged partial detail section taken through one of the bearing members, and Fig. 6, a detail view of one of a plurality of rocker members employed in the construction.

The preferred form of construction as illustrated in the drawings comprises car body bolsters 7 of any usual or desired construction, two of which are provided across each end of the car. Each end of the car is also mounted upon the usual truck 8 which is provided with six flanged wheels 9 running on the tracks in the usual way. Each truck 8 is equipped with two cross bolsters 10 on which are mounted longitudinal supporting beams 11 carrying a central supporting bolster 12 upon which the pivotal mounting 13 is centrally positioned and serves as the usual pivotal mounting of the car body on the truck. The cross bolsters 10 are extended at each side through the side frames of the truck 8 and supporting bars 10' are arranged across and secured to said ends as shown. Each supporting bar 10' carries a rub side bearing 8' of usual form and operation to contact with similar usual side bearings on the car body preventing lateral tilting of the car body in operation.

Arranged directly forward and back of the pivotal mounting 13 on the bolsters 10 are bearing housings 14 in segmental form and having a curvature about the center of the bearing 13. Each housing 14 is provided with two pockets 15 in which is positioned a rocker 16. Each rocker 16 is eccentric in form, the lower surface thereof being struck from an upper center 17 and the upper surface thereof being struck from a lower center 18 as indicated in Fig. 5, and whereby each rocker tends to normally assume a vertical position as will be readily understood. Each rocker is provided on its upper and lower surfaces with teeth 19, the teeth on the lower surface operating in suitable holes or sockets 20 in the bottom of housing 14. The teeth on the upper surface of each rocker operate in corresponding holes or sockets 21 provided in a co-operating bearing housing 22 secured to the bolster 7 in registration with each housing 14, the housings 22 being similar in all respects to the housings 14 as indicated and similarly engaging the upper ends of the rocker 16. The housings 22 and 14 are provided with bearing extensions 23 arranged to contact with each other when the truck is in normal central position as shown. When the truck turns, however, the eccentric shape of the rockers 16 serve to separate the bearing members 23 as shown in Fig. 4.

Each rocker member is provided at its upper side portions with laterally extending lugs or arms 24 fitting into corresponding openings 25 in the upper housing 22, the lugs 24 and the teeth 19 operating and co-operating to constantly maintain the rockers in proper positions in the housings during various movements of said housings in the operation of the car.

In operation as the car travels along a straight track with the trucks in normal position thereunder, the bearing members 23 rest in contact with each other and thus take the load off of the rockers 16. When a curve in the road is encountered the truck is forced to turn relatively to the car body, thus rocking the rockers 16 and elevating the bearing members 23 from contact with each other as illustrated in Fig. 4, so that the car body then rides upon the rockers 16. Owing to the eccentric shape of the rockers 16 the rockers always tend to assume normal central positions in the housings and thus tend to return the truck to normal central straight-ahead position, so that when the car runs off of the curve onto the straight track the trucks will be restored automatically to straight-ahead position and friction between the wheel flanges and the rails avoided. Likewise, any departure from central position tends to elevate the car body and thus prevents or alleviates side movement or swaying of the car.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. The combination with a car body and truck therefor, said body being pivotally mounted on said truck, of upper and lower bearing members on said body and truck, normally bearing against each other, and arranged substantially forward and back of the truck pivot; and means operating to separate said bearing members vertically when the truck turns, substantially as described.

2. The combination with a car body and truck therefor, said body being pivotally mounted on said truck, of upper and lower bearing members on said body and truck, normally bearing against each other, and arranged substantially forward and back of the truck pivot; and eccentric rockers interposed between said body and truck and operating to separate said first mentioned bearing members when the truck turns, substantially as described.

3. The combination with a car body and truck therefor, said body being pivotally mounted substantially centrally on said truck, of upper and lower bearing members on said body and truck, normally bearing against each other, and situated substantially forward and back of the truck pivot; and means interposed between said bearing members and operating to separate them vertically when the truck turns, substantially as described.

4. The combination with a car body and truck therefor, said body being pivotally mounted substantially centrally on said truck, of upper and lower bearing members on said body and truck, normally bearing against each other, and situated substantially forward and back of the truck pivot; and eccentric rockers interposed between said bearing members and operating to separate them when the truck turns, substantially as described.

In testimony whereof I have signed my name to this specification.

ELMYR A. LAUGHLIN.